United States Patent [19]

Meier

[11] Patent Number: 4,930,294

[45] Date of Patent: Jun. 5, 1990

[54] APPARATUS FOR CONTINUOUSLY CLEANING SOLVENT FROM WASTE AIR

[76] Inventor: Rene Meier, Reckenbuhlstrasse 21, 6005 Luzern, Switzerland

[21] Appl. No.: 400,126

[22] Filed: Aug. 29, 1989

[30] Foreign Application Priority Data

Aug. 31, 1988 [CH] Switzerland ........................ 03250/88

[51] Int. Cl.5 .............................................. B01D 53/04

[52] U.S. Cl. ........................................ 55/180; 55/208; 55/387

[58] Field of Search .................... 55/33, 58, 59, 62, 74, 55/179, 180, 208, 387

[56] References Cited

U.S. PATENT DOCUMENTS

| | | | |
|---|---|---|---|
| 1,717,103 | 6/1929 | Godel | 55/59 X |
| 1,934,301 | 11/1933 | Godel | 55/59 X |
| 2,195,565 | 4/1940 | Fricke | 55/316 X |
| 2,818,133 | 12/1957 | Rosenthal | 55/59 |
| 3,123,453 | 3/1964 | Loomer et al. | 55/62 X |
| 3,242,650 | 3/1966 | Crawford | 55/62 X |
| 3,768,232 | 10/1973 | Farber et al. | 55/58 |
| 4,021,211 | 5/1977 | Turek et al. | 55/59 X |
| 4,038,050 | 7/1977 | Lowther | 55/58 X |
| 4,056,369 | 11/1977 | Quackenbush | 55/58 |
| 4,074,984 | 2/1978 | Führing | 55/179 X |
| 4,251,924 | 2/1981 | Beck et al. | 55/59 X |
| 4,289,505 | 9/1981 | Hardinson et al. | 55/180 X |
| 4,312,640 | 1/1982 | Verrando | 55/33 |
| 4,312,641 | 1/1982 | Verrando et al. | 55/33 |
| 4,322,394 | 3/1982 | Mezey et al. | 55/33 X |
| 4,364,753 | 12/1982 | Wagner | 55/179 |
| 4,414,003 | 11/1983 | Blaudszun | 55/179 X |
| 4,421,532 | 12/1983 | Sacchetti et al. | 55/58 X |
| 4,689,054 | 8/1987 | Vara et al. | 55/62 X |
| 4,859,216 | 8/1987 | Fritsch | 55/62 X |

FOREIGN PATENT DOCUMENTS

| | | |
|---|---|---|
| 0019879 | 12/1980 | European Pat. Off. . |
| 0218601 | 4/1987 | European Pat. Off. . |
| 515296 | 12/1930 | Fed. Rep. of Germany . |
| 8605704 | 10/1986 | PCT Int'l Appl. . |
| 2006041 | 5/1979 | United Kingdom . |

*Primary Examiner*—Robert Spitzer
*Attorney, Agent, or Firm*—Marshall & Melhorn

[57] ABSTRACT

An apparatus for the continuous cleaning of solvent containing waste air operates in two phases with two identical receiving towers each with at least one microwave generator and one common vacuum evaporator. In a cleaning phase, the waste air is conducted through a first tower, where the solvents are extracted from the waste air in a closed evaporator container by a receiving medium adsorbing substances of low polarity, and pure air is exhausted to the atmosphere. As soon as the receiving medium is saturated, the first tower is switched to a regenerating phase, in which the waste air is simultaneously conducted through the second receiving tower during its cleaning phase while a vacuum evaporation device and an associated microwave generator is switched on in the first receiving tower. At a low temperature, the solvents evaporate from the evaporator container isolated in the first tower and condense to collect as reusable solvent in a collecting container. After termination of the regenerating phase of the first tower and the cleaning phase of the second tower, the described process is repeated.

13 Claims, 1 Drawing Sheet

APPARATUS FOR CONTINUOUSLY CLEANING SOLVENT FROM WASTE AIR

BACKGROUND OF THE INVENTION

The present invention relates generally to an apparatus for continuously cleaning solvent from waste air and, in particular, to an apparatus for the regeneration of the solvent receiving medium and for the recuperation of the solvent.

A process and a device for the continuous cleaning of solvent containing waste air, for example industrial waste air, with the simultaneous recuperation of the solvent media, is described in the Swiss patent application No. 04 500/87-6 by the inventor of the present invention. In this process and in this device, a commercially available adsorption medium is utilized in two adsorption towers connected in series by pipes, which medium preferentially adsorbs water due to its high polarity. Eventually, already adsorbed substances of low polarity, such as for instance solvents, are displaced by the water. By this adsorption process, the industrial waste air is directed through the medium in one direction, the contaminates removed from the waste air and the purified waste air exhausted to the environment.

In order to obtain a definite separation between the accumulated water and the contaminates, a humidity sensor is positioned at the end of the flow path through the first adsorption tower. As soon as the first adsorption tower is saturated with water, the humidity sensor responds by stopping the flow of air through the first tower and switching on an identical parallel second device for a continuous cleaning operation. Simultaneously with the saturation of the first adsorption tower, all displaced noxious materials of low polarity are accumulated in the second adsorption tower. By an appropriate switching-over, dry warm air is directed in the opposite direction through the first adsorption tower, which air picks up the water deposited in the adsorption medium and is exhausted as humid heated air to the environment. The solvents deposited in the second adsorption tower are desorbed or evaporated by a counter flow current produced by a vacuum pump and with the aid of a microwave generator at low temperature, and these solvents are recuperated in liquid form by condensation. During this regeneration phase, the parallel second device operates in the cleaning phase until the humidity sensor responds to lowered humidity. Both towers of the first device are then switched again into their starting phase and the above described process repeats itself.

A drawback of this process and of this installation is that, for uninterrupted operation, an apparatus is required which has at least two pairs each with two series connected adsorption towers, that is a total of four adsorption towers, in order to be able to continuously process the waste air and perform simultaneously an adsorption phase and a desorption phase.

SUMMARY OF THE INVENTION

The present invention concerns an apparatus which provides continuous cleaning of solvent containing waste air and for the recuperation of the solvents, and is more economical and less expensive than known devices. This apparatus utilizes a receiving medium which preferably adsorbs substances of low polarity, for example solvents, from the waste air such that only one receiving tower is required. For a continuous operation with simultaneous adsorption and desorption phases only two of the towers are required.

A receiving tower according to the present invention includes an evaporator housing enclosing an evaporator container holding a receiving medium. In a cleaning phase, the waste air is directed through the receiving medium in a first direction whereby the solvent is adsorbed and substantially pure air is exhausted. This phase is continued until the medium is saturated with the solvent.

The desorption or regeneration phase is started by blocking the waste air flow path and connecting a vacuum pump and condenser to the evaporator container. A microwave generator located in the container is switched on. A pressure equalization device equalizes the pressures in the housing and the container and a cost efficient insulating layer is formed by the generated vacuum around all sides of the container, which layer also provides for a better distribution of the microwaves. Independently of the outside temperature, an increase in output is thereby achieved. The partially corrosive solvent does not come in contact with a wall of the receiving tower, so that the receiving tower can be manufactured of regular steel plate, for example, based on purely structural principles.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
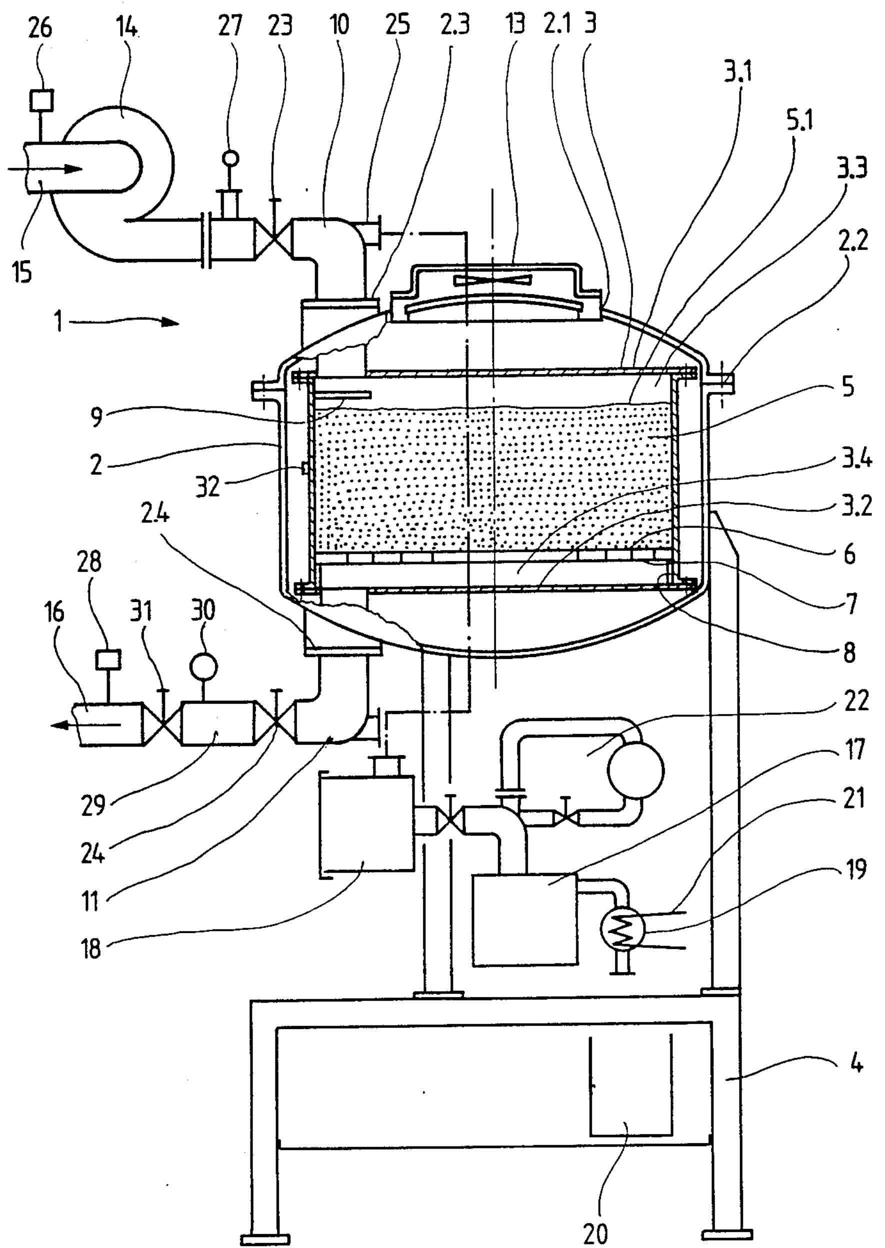
FIG. 1 is a schematic front elevational view of an apparatus in accordance with the present invention with a receiving tower shown in partial cross section.

In the FIG. 1, a receiving and cleaning tower 1 receives industrial waste air through an intake or inlet pipe 15 coupled between a source of waste air (not shown) and an intake stack 10 of the receiving tower. A fan 14 is connected between the pipe 15 and the stack 10 to draw in the industrial waste air from the pipe and convey the air through the receiving and cleaning tower 1. The cleaned waste air exits the tower 1 by way of an outlet or exhaust connector 11 coupled to an exhaust pipe 16 which pipe is connected to a chimney or stack (not shown) open to the environment.

The receiving tower 1 includes an evaporator housing 2 enclosing an evaporator container 3. The intake stack 10 and the exhaust connector 11 extend through the upper and lower walls respectively of the evaporator housing 2 and open directly into the evaporator container 3. The ends of the stack 10 and connector 11 are sealed to an upper cover 3.1 and a lower cover 3.2 respectively, which covers are releasably fastened to and close the top and bottom respectively of the container 3. The intake stack 10, the exhaust connector 11, the evaporator container 3 and the covers 3.1 and 3.2 are all manufactured of a material which is neutral to or passes microwaves, while the evaporator housing 2 and an evaporator housing cover 2.1 are manufactured of any suitable material such as regular steel plate.

Positioned between the evaporator housing 2 and the attached evaporator housing cover 2.1 is a cover packing or seal 2.2. The intake stack 10 and the exhaust connector 11 are sealed to the evaporator housing cover 2.1 and the evaporator housing 2 respectively by a pipe seal 2.3 and a pipe seal 2.4 respectively. The interior of the evaporator container 3 includes an upper free space 3.3 and a lower free space 3.4. The lower free space 3.4 is formed between an upper surface of the lower cover 3.2 and a combined perforated plate 7 and a fine sieve 6. The plate 7 and the sieve 6 are supported by a support ring 8 resting on the cover 3.2 adjacent a side wall of the container 3.

The upper free space 3.3 is formed between a lower surface of the upper cover 3.1 and an upper surface 5.1 of a receiving or adsorbing medium 5 supported on the plate 7 and the sieve 6. The receiving medium is, for example, a resin material partially filling the evaporator container 3 for adsorbing the solvent vapors contained in the industrial waste air. Between the surface 5.1 and the entrance of the intake stack 10 into the evaporator container 3, a generally horizontally extending baffle plate 9 is attached to the interior side wall of the container 3 to prevent the receiving medium 5 from being blown into the entrance of the stack 10 by the entering waste air.

The adsorbed solvent is removed from the receiving medium 5 by a vacuum pump 17 having an inlet in fluid communication through an air filter 18 and associated piping with the interior of the container 3. A condenser 19, with a cooling water line 21, has an inlet connected to an outlet of the pump 17 and a condensate catching container 20 is positioned below the receiving tower 1, or to the side depending on the existing space conditions, at the outlet of the condenser 19. Attached to the cover 2.1 of the evaporator housing 2 is at least one microwave generator 13.

Various checking and control devices are built into the apparatus. Provided in the inlet pipe 15 is a waste gas measuring means or device 26 and provided in the line between the fan 14 and the intake stack 10 is a waste gas pressure measuring device 27 and a shut-off valve 23. Located in the exhaust pipe 16 is a pure gas measuring device 28 and located between the exhaust connector 11 and the exhaust pipe 16 are a shutoff valve 24, a gas flow measuring section 29 with a pressure manometer 30 and a throttle valve 31. Connected between the air filter 18 and the vacuum pump 17 is a vacuum regulator 22. The apparatus also includes a ground engaging frame 4 which supports all of the elements described above.

The apparatus according to the present invention operates in two operational phases, a cleaning phase (adsorption) and a regeneration phase (desorption). In the cleaning phase, industrial waste air is carried through the intake stack 10 into the receiving tower 1 and, with the aid of the fan 14, forced through the receiving medium 5 which preferentially adsorbs substances of low polarity. Thusly, the solvent gases contained in the industrial waste air are removed and substantially pure exhaust air leaves the receiving tower 1 by way of the connector 11 through the exhaust pipe 16 and the chimney (not shown) into the atmosphere. This phase continues until the receiving medium 5 is saturated with the solvent.

As soon as the measurement of pure gas in the exhaust pipe 16 has attained the correspondingly predetermined value, the apparatus is automatically switched over to the regenerating phase. The shut-off valves 23 and 24 are closed and the vacuum pump 17 and the microwave generator 13 are switched on. In this regenerating phase, the vacuum pump 17 generates a vacuum in the closed evaporator container 3 and, through a pressure equalization device connected between the interior of the evaporator housing 2 and the interior of the evaporator container 3, also in the evaporator housing 2. In this manner, the adsorbed solvents evaporate from the receiving medium 5 at a low temperature and an insulating layer favorable to the evaporation of the solvents is created automatically around the evaporator container 3. The pressure equalization device connected between the evaporator housing 2 and the evaporator container 3 can be a leak in the wall of the evaporator container 3 or between the wall and one of the covers which does not influence the desired direction of the solvent vapor stream.

The vacuum in the space between the evaporator housing 2 and the evaporator container 3 additionally permits a uniform distribution of the microwaves which cause the evaporation of even the last residual quantities of solvent from the receiving medium 5. The solvent vapor flows in a direction opposite to the flow of the industrial waste air in the cleaning phase. The solvent vapor flows into the intake stack 10 due to the closed valves 23 and 24, through a distributor 25 (phantom line connected to the stack 10 and the air filter 18) and to the vacuum pump 17. The vapor flows from the pump 17 into the condenser 19, where it condenses on the walls of the cooling water pipe 21 and flows again as usable solvent into the condensate collecting container 20. As soon as the adsorbed solvent evaporates from the receiving medium 5 and has been recovered in the condenser 19, the apparatus can be switched from the regeneration phase back to the cleaning phase.

It is possible to operate the present invention in a continuous, uninterrupted operation by utilizing two identical receiving towers 1 connected appropriately to the source of waste air, each tower having at least one microwave generator 13. While one receiving tower 1 works in the cleaning phase and receives the solvents from the industrial waste air, the adsorbed solvent is removed by evaporation from the other receiving tower 1 in the regeneration phase. The switching over in each case from one phase to the other takes place automatically through appropriate control devices and control valves (not shown). For example, the detection of saturation in the medium 5 in the one of the towers 1 in the cleaning phase would trigger phase reversals in both of the towers as described above and one vacuum pump could be shared.

In the above description and in the FIG. 1, the microwave generator 13 is located on the cover 2.1 of the evaporator housing 2. It is possible to locate the microwave generator 13 at any other position in the evaporator housing 2. It is also possible to carry out the desorption of the receiving material 5 in the regeneration phase in such a manner that the vacuum pump 17 would be attached at the same time to the intake stack 10 and to the exhaust connector 11 (phantom line in FIG. 1). A pressure equalizing valve 32, located at approximately the middle of the side wall of the evaporating container 3, would be required as a pressure equalization device connected between the interior of the housing 2 and the interior of the container 3.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for the continuous cleaning of solvent containing waste air with a regenerable receiving medium, for the exhausting of substantially pure air into the atmosphere, for the regeneration of the receiving medium and for the recuperation of the solvent, the apparatus having two receiving towers each containing an evaporator housing for the receiving medium and at least one microwave generator, a vacuum pump and a condenser, comprising:

an evaporator container formed of material neutral to microwaves enclosed by and spaced from all walls of an evaporator housing of a receiving tower, said evaporator container containing a receiving medium for the preferred reception of substances of low polarity;

a pressure equalizing device connected between an interior of said evaporator housing and an interior of said evaporator container;

an intake stack adapted to be connected at one end to a source of solvent containing waste air and connected at an opposite end to said interior of said evaporator container; and an exhaust connector open at one end to the atmosphere and connected at an opposite end to said interior of said evaporator container.

2. The apparatus according to claim 1 wherein said pressure equalizing device is a leak in said evaporator container.

3. The apparatus according to claim 1 wherein said pressure equalizing device is a pressure equalizing valve positioned at approximately a middle of a side wall of said evaporator container.

4. The apparatus according to claim 1 wherein said evaporator container defines an upper free space and a lower free space between said receiving medium and an upper cover and a lower cover respectively, said covers being releasably fastened to said evaporator container.

5. The apparatus according to claim 4 wherein said pressure equalizing device is a leak provided between a side wall of said evaporation container and one of said covers.

6. The apparatus according to claim 4 wherein said pressure equalizing device is a pressure equalizing valve positioned at approximately a middle of a side wall of said evaporator container.

7. The apparatus according to claim 1 including a baffle plate positioned in said evaporator container between an upper surface of the receiving medium and a connection of said intake stack to said evaporator container.

8. The apparatus according to claim 1 wherein a seal pipe tightly seals each of said intake stack and said exhaust connector to said evaporator housing and to said evaporator container.

9. An apparatus for the continuous adsorption and desorption of solvent from waste air comprising:

an evaporator housing supported by a ground engaging frame;

an evaporator container enclosed by and spaced from all walls of said evaporator housing, said container containing solvent adsorbent material;

an intake stack having one end adapted to be connected to a source of solvent containing waste air and an opposite end connected to an interior of said container;

an exhaust connector having one end adapted to be open to the atmosphere and an opposite end connected to said interior of said container;

a pressure equalizing device connected between an interior of said housing and said interior of said container;

a microwave generator positioned in said interior of said housing; and a series connected vacuum pump and condenser connected to said intake stack for desorbing solvent from said receiving medium.

10. The apparatus according to claim 9 including one shut-off valve connected to said intake stack and another shut-off valve connected to said exhaust connector for blocking said intake stack and said exhaust connector respectively during operation of said vacuum pump.

11. The apparatus according to claim 9 including a baffle plate positioned in said container between an upper surface of said medium and said opposite end of said intake stack.

12. The apparatus according to claim 9 including a perforated plate and a fine sieve positioned in said container and supporting said medium.

13. An apparatus for the continuous cleaning of solvent containing waste air with a regenerable receiving medium and for the regeneration of the medium comprising:

two receiving towers each having an evaporator housing with at least one microwave generator;

a pair of evaporator containers, each said evaporator container enclosed by and spaced from all walls of an associated one of said housings and containing a solvent receiving medium;

a pair of intake stacks and a pair of exhaust connectors, each said stack having one end adapted to be connected to a source of waste air, each said connector having one end adapted to be open to the atmosphere, and each said stack and connector having an opposite end extending through said wall of an associated one of said housings and connected to an interior of an associated one of said containers;

a series connected vacuum pump and condenser in fluid communication with said interiors of said containers; and a plurality of shut-off valves connected to said one end of each of said stacks and said connectors whereby said valves alternately permit waste air flow through and block fluid communication with said vacuum pump with respect to each one of said containers while blocking waste air flow through and permitting fluid communication with said vacuum pump with respect to the other one of said containers.

* * * * *